United States Patent [19]
Sasaki

[11] Patent Number: 6,154,347
[45] Date of Patent: Nov. 28, 2000

[54] COMBINATION TYPE THIN FILM MAGNETIC HEAD AND METHOD OF MANUFACTURING THE SAME

[75] Inventor: Yoshitaka Sasaki, Yokohama, Japan

[73] Assignee: TDK Corporation, Tokyo, Japan

[21] Appl. No.: 09/257,184

[22] Filed: Feb. 25, 1999

[30] Foreign Application Priority Data

Feb. 22, 1998 [JP] Japan .................................. 10-047810

[51] Int. Cl.$^7$ ...................................................... G11B 5/39
[52] U.S. Cl. .............................................................. 360/317
[58] Field of Search ............................................. 360/317

[56] References Cited

U.S. PATENT DOCUMENTS

| | | | |
|---|---|---|---|
| 5,435,053 | 7/1995 | Krunbi et al. ........................ | 29/603.25 |
| 5,438,747 | 8/1995 | Krounbi et al. ..................... | 29/603.16 |
| 5,452,164 | 9/1995 | Cole et al. ............................ | 360/113 |
| 5,606,478 | 2/1997 | Chen et al. ........................... | 360/126 |
| 5,617,277 | 4/1997 | Chen et al. . | |
| 5,668,689 | 9/1997 | Schultz et al. ....................... | 360/113 |
| 6,034,848 | 3/2000 | Garfunkel et al. ................... | 360/126 |

FOREIGN PATENT DOCUMENTS 6-334237 12/1994 Japan .
9-91632 4/1997 Japan .

*Primary Examiner*—William Klimowicz
*Attorney, Agent, or Firm*—Oliff & Berridge, PLC

[57] ABSTRACT

A combination type thin film magnetic head including a magnetoresistive type reading thin film magnetic head and an inductive type writing thin film magnetic head is formed by forming a first magnetic layer 33 having a thickness of about 70–150 nm on a whole surface of an insulating substrate 31, 32, forming a second magnetic layer 34 having a thickness of about 2–3 μm on the first magnetic layer at a restricted area at which a MR element will be formed later, forming a first insulating layer 35 having a thickness smaller than the second magnetic layer on the first magnetic layer, forming a shield gap layer on the first and second magnetic layers such that a magnetoresistive layer 37 is embedded within a portion of the shield gap layer formed on the second magnetic layer, forming a third magnetic layer on the shield gap layer, forming a thin film coil 43, 45 on a portion of the third magnetic layer situating above the first insulating layer, forming a write gap layer 46 on the third magnetic layer and thin film coil, and forming a fourth magnetic layer 47 on the write gap layer. The combination type thin film magnetic head can solve the problem of the thermal asperity, while the insulating property of shield gap layer and the magnetic shielding property can be improved.

15 Claims, 14 Drawing Sheets

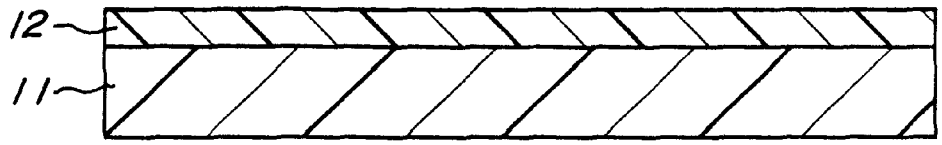
FIG._1  PRIOR ART
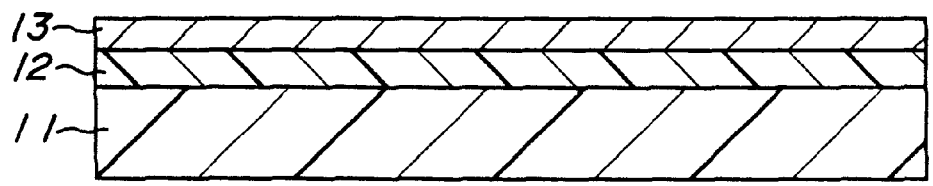
FIG._2  PRIOR ART
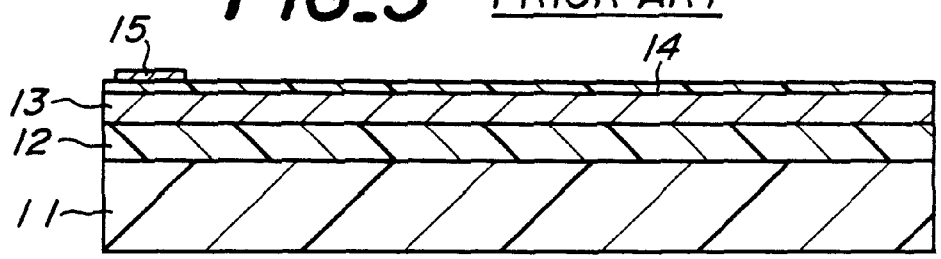
FIG._3  PRIOR ART
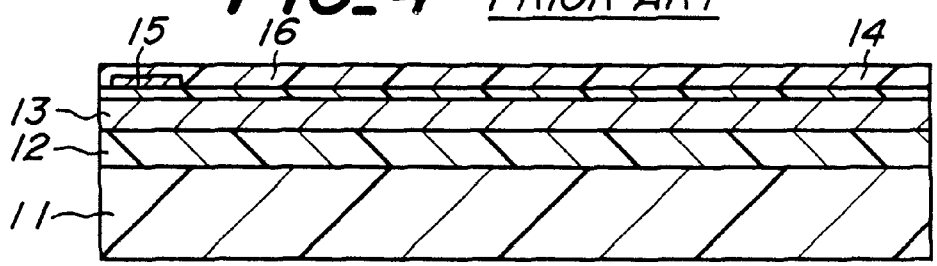
FIG._4  PRIOR ART
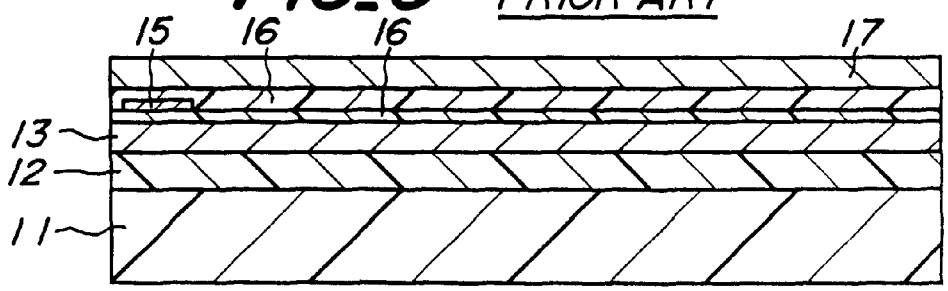
FIG._5  PRIOR ART

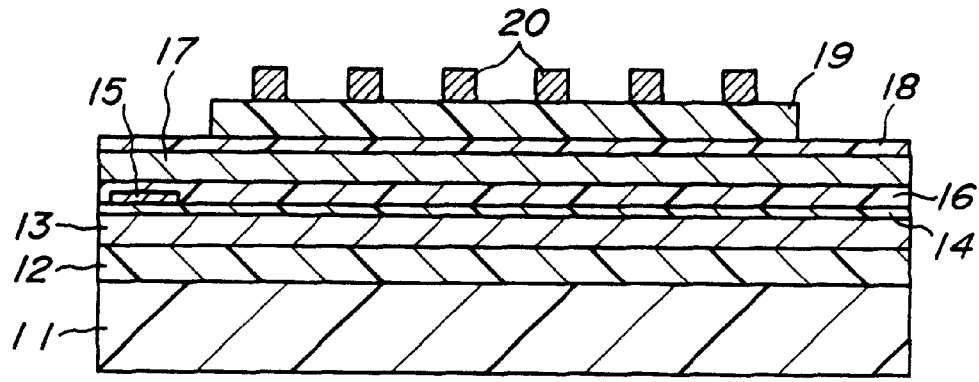
FIG._6  PRIOR ART
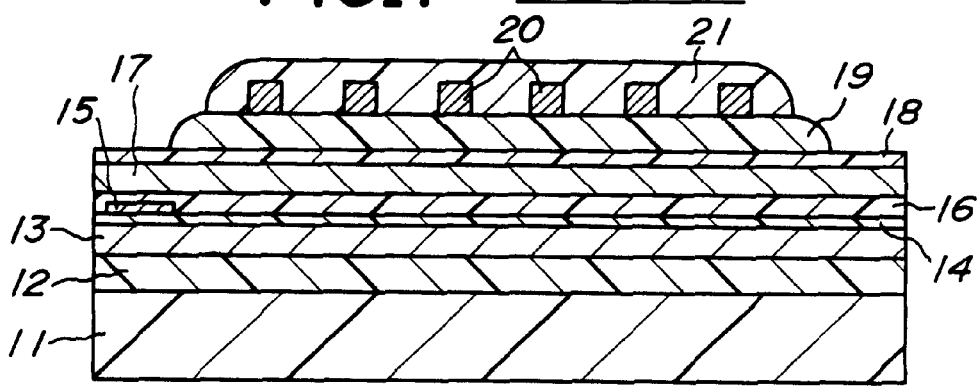
FIG._7  PRIOR ART
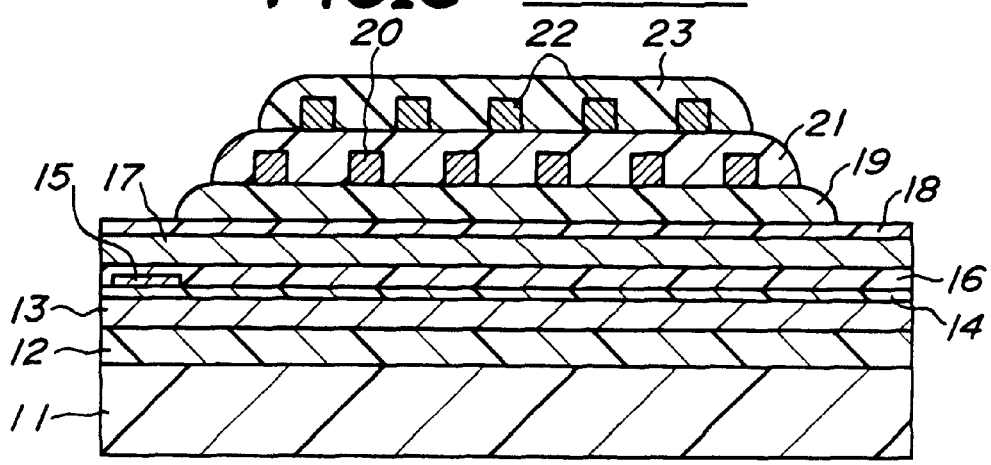
FIG._8  PRIOR ART

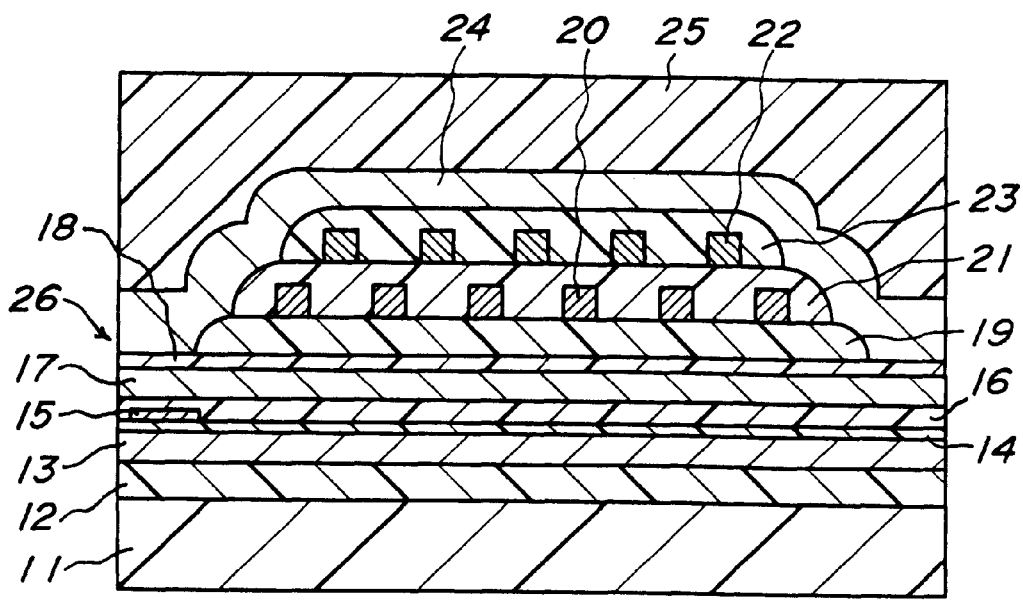
FIG_9 PRIOR ART
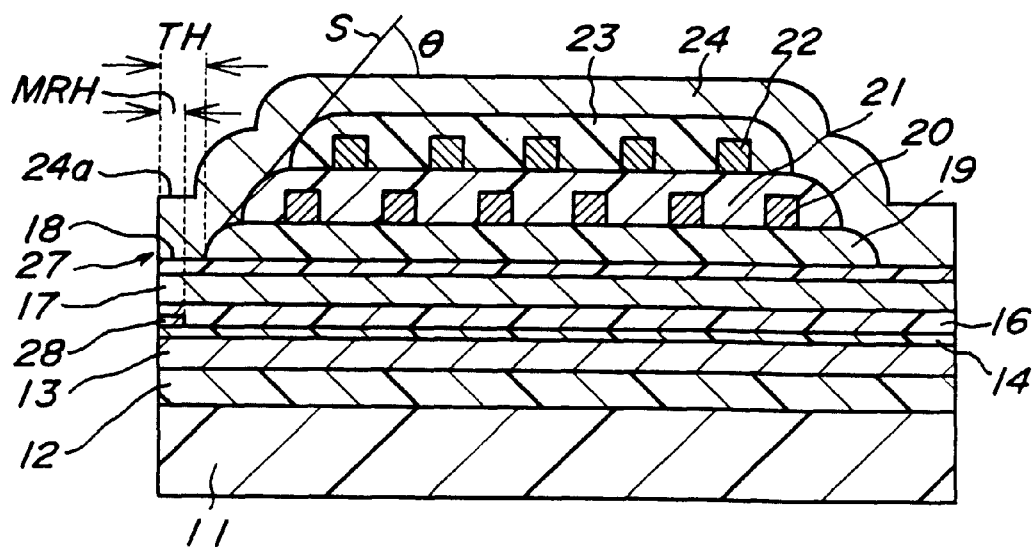
FIG_10 PRIOR ART

FIG_11 _PRIOR ART_
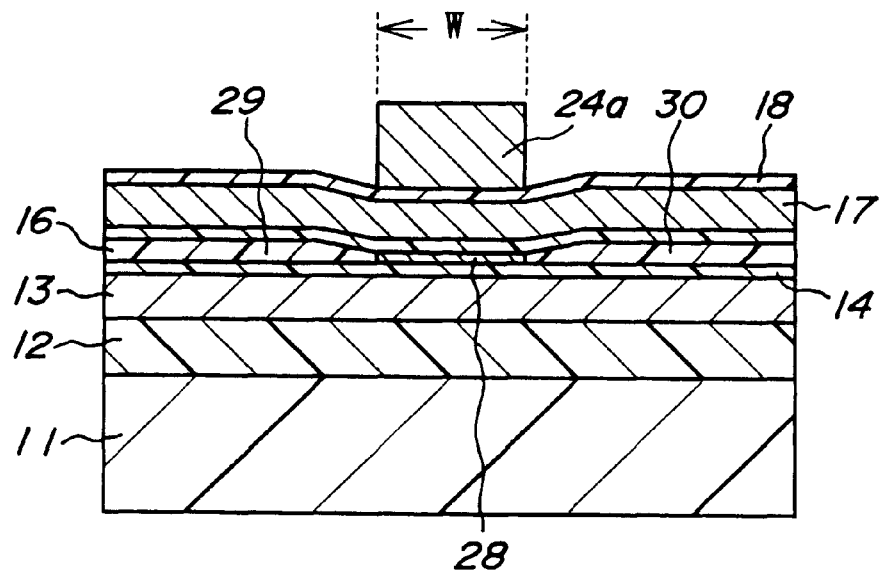
FIG_12 _PRIOR ART_
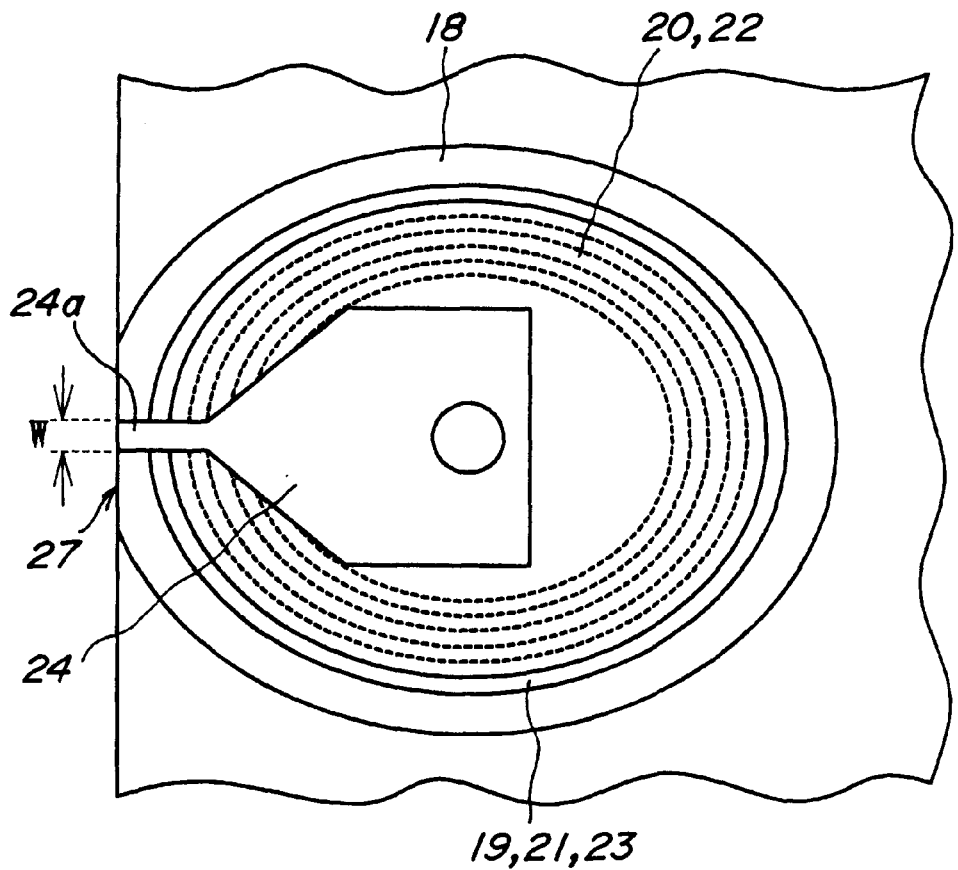

FIG_19

COMBINATION TYPE THIN FILM MAGNETIC HEAD AND METHOD OF MANUFACTURING THE SAME

BACKGROUND OF THE INVENTION

1. Field of the Invention

The present invention relates to a combination type thin film magnetic head constructed by stacking an inductive type writing thin film magnetic head and a magnetoresistive type reading thin film magnetic head on a surface of a substrate in an electrically insulating and magnetically isolated manner. The present invention also relates to a method of manufacturing such a thin film magnetic head.

2. Description of the Related Art

Recently a surface recording density of a hard disc device has been improved, and it has been required to develop a thin film magnetic head having an improved performance accordingly. A combination type thin film magnetic head is constructed by stacking an inductive type thin film magnetic head intended for writing and a magnetoresistive type thin film magnetic head intended for reading on a substrate, and has been practically used. In general, as a reading magnetoresistive element, an element utilizing anisotropic magnetoresistive (AMR) effect has been used so far, but there has been further developed a GMR reproducing element utilizing a giant magnetoresistive (GMR) effect having a resistance change ratio higher than that of the normal anisotropic magnetoresistive effect by several times.

In the present specification, elements exhibiting a magnetoresistive effect such as AMR and GMR reproducing elements are termed as a magnetoresistive reproducing element or MR reproducing element.

By using the AMR reproducing element, a very high surface recording density of several gigabits/inch$^2$ has been realized, and a surface recording density can be further increased by using the GMR element. By increasing a surface recording density in this manner, it is possible to realize a hard disc device which has a very large storage capacity of more than 10 gigabytes.

A height of a magnetoresistive reproducing element (MR Height: MRH) is one of factors which determine a performance of a reproducing head including a magnetoresistive reproducing element. The MR height MRH is a distance measured from an air bearing surface on which one edge of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, the performance of the recording magnetic head is also required to be improved in accordance with the improvement of the performance of the reproducing magnetic head. In order to increase a surface recording density, it is necessary to make a track density on a magnetic record medium as high as possible. For this purpose, a width of a write gap at the air bearing surface has to be reduced to a value within a range from several micron meters to several sub-micron meters. In order to satisfy such a requirement, the semiconductor manufacturing process has been adopted for manufacturing the thin film magnetic head.

One of factors determining the performance of the inductive type writing thin film magnetic head is a throat height TH. This throat height TH is a distance of a pole portion measured from the air bearing surface to an edge of an insulating layer which serves to separate a thin film coil from the air bearing surface. It has been required to shorten this distance as small as possible. The reduction of this throat height is also decided by an amount of polishing the air bearing surface.

Therefore, in order to improve the performance of the combination type thin film magnetic head including the inductive type recording head and magnetoresistive reading head, it is very important to make the performance of the recording head and the performance of the reading head to be balanced with each other, rather than to improve the performances of these heads independently.

FIGS. 1–12 show successive steps of a method of manufacturing a conventional standard thin film magnetic head and a finally manufactured completed thin film magnetic head. It should be noted that the thin film magnetic head is of a combination type in which the inductive type thin film magnetic head for writing is stacked on the reproducing MR element.

First of all, as shown in FIG. 1, an alumina insulating layer 12 having a thickness of about 5–10 μm is deposited on a substance 11 made of, for instance AlTiC.

Next, as shown in FIG. 2, a bottom shield magnetic layer 13 which protects the MR reproduction element of the reproducing head from the influence of an external magnetic field, is formed with a thickness of 3 μm. Then, as shown in FIG. 3, an alumina insulating layer 14 of thickness 100–150 nm serving as a bottom shield gap layer is formed by sputtering alumina.

As illustrated in FIG. 3, a magnetoresistive layer (MR layer) 15 made of a material having the magnetoresistive effect and constituting the MR reproduction element is formed on the shield gap layer 114 with a thickness of several tens nano meters and is then shaped into a given pattern by the highly precise mask alignment.

Then, as shown in the FIG. 4, an alumina insulating layer 16 serving as a top shielding layer like as the alumina insulating layer 14 is formed such that the magnetoresistive layer 15 is embedded within the insulating layers 14 and 16.

Next, as shown in the FIG. 5, a magnetic layer 17 made of a permalloy is formed with a thickness of 3–4 μm. This magnetic layer 17 has not only the function of the upper shield layer which magnetically shields the MR reproduction element together with the above described bottom shield layer 13, but also has the function of one of poles of the writing thin film magnetic head. Here, the magnetic layer 17 is called a first magnetic layer by taking into account the latter function.

Then, as depicted in FIG. 6, a write gap layer 18 made of a non-magnetic material such as alumina and having a thickness of about 150–300 nm is formed on the first magnetic layer 17, and an electrically insulating layer 19 made of a photoresist is formed on the write gap layer into a given pattern by the mask alignment of high precision. Further, a first layer thin film coil 20 made of, for instance a copper is formed on the photoresist layer 19.

Continuously, as shown in FIG. 7, after forming an electrically insulating photoresist layer 21 on the thin film coil 20 by the highly precise mask alignment, the photoresist layer is sintered at a temperature of, for example 250° C.

In addition, as shown in FIG. 8, a second layer thin film coil 22 is formed on the flattened surface of the photoresist layer 21. Next, after forming a photoresist layer 23 on the second layer thin film coil 22 with the highly precise mask alignment, the photoresist layer is flattened by baking it at a temperature of, for example 250° C.

As described above, the reason why the photoresist layers 19, 21 and 23 are formed by the highly precise mask alignment process, is that the throat height TH and MR height MRH are defined with reference to a position of the edges of the photoresist layers.

Next, as shown in FIG. 9, a second magnetic layer 24 made of, for example a permalloy and having a thickness of 3–4 μm is selectively formed on the gap layer and photoresist layers 19, 21 and 23 in accordance with a desired pattern. This second magnetic layer 124 is coupled with the first magnetic layer 17 at a rear position remote from the magnetoresistive layer 15, and the thin film coil 20, 22 passes through a closed magnetic circuit composed of the first and second magnetic layers. The second magnetic layer 24 includes a pole portion having desired size and shape for defining a track width W.

Furthermore, an overcoat layer 25 made of alumina is deposited on the exposed surface of the write gap layer 18 and second magnetic layer 24. In an actual thin film magnetic head, electric conductors and contact pads for performing the electrical connection to the thin film coils 20, 22 and MR reproduction element are formed, but they are not shown in the drawings.

In an actual manufacturing process, the above mentioned substrate 11 is formed by a wafer, and after forming a number of thin film magnetic head units in the wafer in matrix, the wafer is divided into a plurality of bars, in each of which a plurality of thin film magnetic head units are aligned, and finally the bar is divided into respective thin film magnetic heads.

That is to say, as shown in FIG. 9, a side surface 26 of the substrate 11 on which the magnetoresistive layer 15 is exposed is polished to form an air bearing surface 27 which is opposed to a magnetic record medium. During the formation of the air bearing surface 27, the magnetoresistive layer 15 is also polished to form a MR reproducing element 28, and at the same time the throat height TH of the inductive type thin film recording magnetic head and the MR height MRH of the magnetoresistive type reproducing element are determined.

When the air bearing surface 27 is polished, it is difficult to perform the polishing while the throat height and MR height are actually monitored. Therefore, a resistance measuring circuit is connected to the conductive patters (not shown) connected to the magnetoresistive layer 15, a change in resistance which is reduced in accordance with a reduction of the height of the magnetoresistive layer due to the polishing is measured as a change in a current, and an amount of polishing is calculated from the variation in the thus measured current. That is to say, by performing the polishing operation until the resistance value of the MR reproducing element 28 becomes a predetermined value, desired throat height and MR height are attained.

FIGS. 10, 11 and 12 are cross sectional, front and plan views, respectively showing the completed conventional thin film magnetic head, while the overcoat layer 25 is omitted. It should be noted that in FIG. 10, the alumina insulating layers 14 and 16 surrounding the MR reproducing element 28 are shown as a single insulating layer, and in FIG. 12, the thin film coil 20, 22 is shown concentrically for the sake of simplicity.

As clearly shown in FIG. 10, an angle θ (apex angle) between a line S connecting side edges of the photoresist layers 19, 21, 23 for isolating the thin film coil 20, 22 and the upper surface of the second magnetic layer 24 is an important factor for determining the performance of the thin film magnetic head together with the above described throat height TH and MR height MRH.

Furthermore, as shown in the plan view of FIG. 12, the width W of a pole portion 24a of the second magnetic layer 24 is small. Since the width of the track recorded on the magnetic record medium is defined by this width W, it is necessary to narrow this width as small as possible in order to achieve a high surface recording density.

In order to improve the surface recording density of the above mentioned combination type thin film magnetic head, it has been proposed to form the MR layer 15 by spin valve GMR film, super lattice GMR film or granular GMR film. Furthermore, in order to make the reproduction sensitivity high, it has been proposed to reduce the MR height.

In accordance with the improvement of the reproducing element, a problem of the thermal asperity has occurred. In the thermal asperity, the reproducing performance of the reproducing element is degraded due to its heat generation. It has been proposed to form the bottom shield layer 13 and shield gap layers 14, 16 of a material having a high cooling faculty. To this end, the lower shield layer 13 is made of a magnetic material such as permalloy and sendust (Si—Al—Fe), and the shield gap layers 14, 16 are made of alumina insulating material. In general, the shield gap layer 14, 16 made of alumina has a thickness of 100–150 nm and is formed by sputtering.

As explained above, in order to solve the problem of the thermal asperity, the thickness of the shield gap layers 14, 16 has to be small such as 50–100 nm. Then, the electrical insulating property and magnetic shielding property between the MR element 28 and the bottom and top shield layers 13 and 17 are liable to be degraded and further the electrically insulating property between the conductive layers 29, 30 and the bottom and top shield layers 13 and 17 due to pin holes and particles contained in the shield gap layers 14, 16. Therefore, the shield gap layers 14, 16 could not be sufficiently thin.

In Japanese Patent Application Laid-open Publication Kokai Hei 6-334237 corresponding to U.S. Pat. No. 5,617, 277, in order to improve the electrical insulating property between conductive layers connected to an MR element and shield layers, a thickness of a part of a shield gap layer situating at the MR element is selectively decreased and a back-fill insulating layer is formed on the thus thinned part of the shield gap layer and the conductive layers are formed on the back-fill layer. In such a structure, it is possible to improve the insulating property between the conductive layers and the bottom shield layer. However, a portion of the bottom shield gap situating below the MR element has a very large thickness, and thus the above mentioned problem of the thermal asperity becomes manifest and the reproducing performance becomes worse.

In Japanese Patent Application Laid-open Publication Kokai Hei 9-91632, there is described a combination type thin film magnetic head, in which in order to leakage of a magnetic flux from a inductive type writing magnetic head into a bottom shield of a magnetoresistive type reproducing element, the bottom shield is locally formed exclusively below the MR element and a remaining portion is filled with an insulating layer. In such a structure, since the insulating layer is formed under the conductive layers, the insulating property is not degraded even if the bottom shield gap layer has a small thickness. However, the lower shield layer is existent only under the MR element, the magnetic shielding could not be effected sufficiently and the MR element might be affected by an external magnetic field. In this manner, the reproducing property might be degraded.

Moreover, in the inductive type thin film magnetic head, a width W of the pole portion 24a of the second magnetic layer 23 is one of factors determining the performance of the magnetic head. Particularly, in order to improve the surface recording density, the width W of the pole portion 24a has to be smaller than about 1 μm.

In the known combination type thin film magnetic head, prior to forming the second magnetic layer 24 by a selective plating, a photoresist layer having a thickness of 3–4 μm is formed on the insulating layers 19, 21, 23 having a thickness of 8–10 μm. Then, at a bottom portion of the insulating layers, i.e. on the write gap layer 18, a thickness of the photoresist layer becomes 8–10 μm.

When the pole portion 24a of the second magnetic layer 24 has to be formed to have a width W of about 1 μm, it is necessary to form a pattern of 1 μm in the photoresist layer having a thickness of 8–10 μm. However, such a fine patterning is very difficult and it is almost impossible to make a width W of the pole portion 24a of the second magnetic layer 24 smaller than 1 μm.

In case of forming the second magnetic layer 24 by electroplating, a thin permalloy film has to be formed on a whole surface of the insulating layers 19, 21, 23 by sputtering. Upon exposure in the photolithography, light might be reflected by said thin permalloy film and the pole portion 24a of the second magnetic layer 24 could not be patterned precisely.

SUMMARY OF THE INVENTION

It is an object of the present invention to provide a combination type thin film magnetic head, in which the above mentioned problem of the thermal asperity can be solved by reducing a thickness of a magnetic shield gap layer, while the degradation of the magnetic shielding property for the MR element can be avoided, and further the pole portion of the second magnetic layer of the inductive type thin film magnetic head can be small.

It is another object of the invention to provide a method of manufacturing the above mentioned combination type thin film magnetic head in an accurate and easy manner.

According to the invention, a combination type thin film magnetic head having an inductive type writing thin film magnetic head and a magnetoresistive type reading thin film magnetic head stacked on a surface of a substrate in a magnetically and electrically isolated manner, comprises:
  a substrate having a surface;
  a first magnetic layer formed on the surface of the substrate and having a first thickness;
  a second magnetic layer having a second thickness larger than said first thickness and being formed on a part of said first magnetic layer such that a step is formed in surfaces of the first and second magnetic layers;
  a first insulating layer formed on the surface of said first magnetic layer and on a side surface of said second magnetic layer at said step, said first insulating layer having a third thickness which is smaller than said second thickness of the second magnetic layer;
  a shield gap layer having a first portion formed on the second magnetic layer and a second portion formed on the first magnetic layer over said step such that the shield gap layer includes a step;
  a magnetoresistive element embedded within said first portion of said shield gap layer formed on said second magnetic layer;
  a third magnetic layer having a first portion formed on said first portion of the shield gap layer situating above said second magnetic layer and a second portion formed on a surface of said second portion of the shield gap layer situating above said first insulating layer, said third magnetic layer extending over said step;
  a thin film coil at least, a part of which is arranged on the second portion of the second magnetic layer situating on said second portion of the shield gap layer, said thin film coil being supported by a second insulating layer in an electrically insulated manner;
  a write gap layer formed to extend from the first portion of the third magnetic layer situating above said first portion of the shield gap layer to the surface of said second insulating layer supporting said thin film coil; and
  a fourth magnetic layer formed on said write gap layer.

In the combination type thin film magnetic head according to the invention, said first thickness of the first magnetic layer which serves as one of magnetic shield members together with said second magnetic layer is preferably set to a value within a range of about 70–150 nm, and said second thickness of said second magnetic layer is preferably set to a value within a range of about 2–3 μm. By reducing the thickness of the first magnetic layer, the heat dissipation faculty can be improved and the problem of the thermal asperity can be effectively solved. Furthermore, by increasing the second thickness of the second magnetic layer formed in the vicinity of the magnetoresistive element and by providing the first magnetic layer over a whole surface of the substrate, it is possible to obtain a sufficient magnetic shield for the magnetoresistive element.

Furthermore, at least a part of the thin film coil is arranged on the second portion of the third magnetic layer serving as the other magnetic shield member for the magnetoresistive type thin film magnetic head as well as one of magnetic poles of the inductive type thin film magnetic head, said second portion of the third magnetic layer situating closer to the substrate. Therefore, a height of the thin film coil with respect to the surface of the first portion of the third magnetic layer situating above the second magnetic layer is lowered, and thus a difference in a thickness of a photoresist layer which is used for forming the fourth magnetic layer becomes small. That is to say, a thickness of the photoresist film at the bottom of the thin film coil does not largely differ from that at the top of the thin film. Therefore, the photoresist film can be precisely patterned into a fine shape, and thus a width of the pole portion of the fourth magnetic layer serving as the top pole of the inductive type thin film magnetic head can be sufficiently narrowed and the surface recording density can be improved.

Furthermore, in the combination type thin film magnetic head according to the invention, the thin film coil is consisting of first and second layer thin film coils, and the first layer thin film coil may be formed to be coplanar with the surface of the first portion of the third magnetic layer situating above the second magnetic layer. Alternately, the first layer thin film coil may be formed such that more than a half of height of the first layer thin film coil does not protrude beyond the surface of said first portion of the third magnetic layer. In these cases, it is preferable that the second layer thin film coil is formed such that a part of the second thin film coil layer is superimposed on said first portion of the third magnetic layer situating above the second magnetic layer. In this case, a distance from the pole portion to the thin film coil can be reduced and an efficiency of the inductive type thin film magnetic head can be improved.

The present invention also relates to a method of manufacturing a combination type thin film magnetic head having a magnetoresistive type thin film magnetic head and an inductive type thin film magnetic head stacked on the magnetoresistive type thin film magnetic head.

According to the invention, a method of manufacturing a combination type thin film magnetic head having a magnetoresistive type thin film magnetic head and an inductive type thin film magnetic head stacked on the magnetoresistive type thin film magnetic head comprises:

- the step of forming a first magnetic layer a surface of a substrate;
- the step of selectively forming a second magnetic layer on at least a portion of said first magnetic layer at which a magnetoresistive element will be formed later, said second magnetic layer being thicker than said first magnetic layer and constituting a step in the surfaces of the first and second magnetic layers;
- the step of forming a first insulating layer on the surface of said first magnetic layer and on a side wall of said second magnetic layer at said step, said first insulating layer being thicker than said second magnetic layer and including a step;
- the step of forming a shield gap layer to extend from the surface of the second magnetic layer to the surface of the first magnetic layer over said step, while a magnetoresistive layer is formed to be embedded within a first portion of said shield gap layer situating above said second magnetic layer;
- the step of forming a third magnetic layer on the shield gap layer over said step such that the third magnetic layer includes a first portion formed on a surface of said first portion of the shield gap layer situating above said second magnetic layer and a second portion formed on a surface of a second portion of the shield gap layer situating above said first insulating layer;
- the step of forming a thin film coil such that at least a part of the thin film coil is arranged on the second portion of the third magnetic layer situating on said second portion of the shield gap layer and the thin film coil is supported by a second insulating layer in an electrically insulated manner;
- the step of forming a write gap layer to extend from the first portion of the third magnetic layer situating above said first portion of the shield gap layer to a surface of said second insulating layer supporting said thin film coil; and
- the step of forming a fourth magnetic layer on said write gap layer.

In a preferable embodiment of the method of manufacturing a combination type thin film magnetic head according to the invention, said step of forming the thin film coil includes a step of forming a first layer thin film coil on the second portion of the third magnetic layer such that the top surface of the second insulating layer becomes coplanar with the surface of the first portion of the third magnetic layer, and a step of forming a second layer thin film coil on the flat surface of the second insulating layer.

In another preferable embodiment of the method of manufacturing the combination type thin film magnetic head according to the invention, said step of forming the thin film coil includes a step of forming a first layer thin film coil on the second portion of the third magnetic layer such that more than a half of a height of the first layer thin film coil does not protrudes beyond the surface of the first portion of the third magnetic layer, and a step of forming a second layer thin film coil on the second insulating layer.

In these embodiments, said second layer thin film coil may be preferably formed such that a part of the second layer thin film coil is superimposed on the first portion of the third magnetic layer.

BRIEF DESCRIPTION OF THE DRAWINGS

FIGS. 1–10 are cross sectional views showing successive steps of a known method of manufacturing a known combination type thin film magnetic head;

FIGS. 11 and 12 are front and plan views, respectively depicting the completed combination type thin film magnetic head shown in FIG. 10;

FIGS. 17A, 17B–23A, 23B are cross sectional views showing successive steps after the step of FIG. 14;

DESCRIPTION OF THE PREFERRED EMBODIMENTS

FIGS. 13–23 show successive steps of a first embodiment of the method of manufacturing the combination type thin film magnetic head according to the invention. In these drawings, sizes of various portions are exaggerated in order to emphasize the features of the present invention. In cross sectional views, A represents a cross sectional view cut along a line perpendicular to the air bearing surface and B denotes a cross sectional view of the pole portion cut along a line parallel with the air bearing surface.

Figure 13:
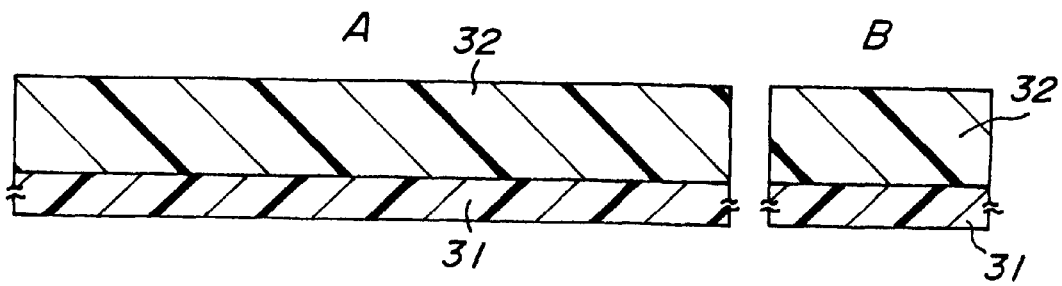
FIGS. 13A and 13B are cross sectional views illustrating a first step of a first embodiment of the method of manufacturing a combination type thin film magnetic head according to this invention.

At first, as shown in FIG. 13, an insulating layer 32 made of alumina and having a thickness of about 5–10 $\mu$m is deposited on a whole surface of a substrate 31 made of AlTiC.

Figure 14:
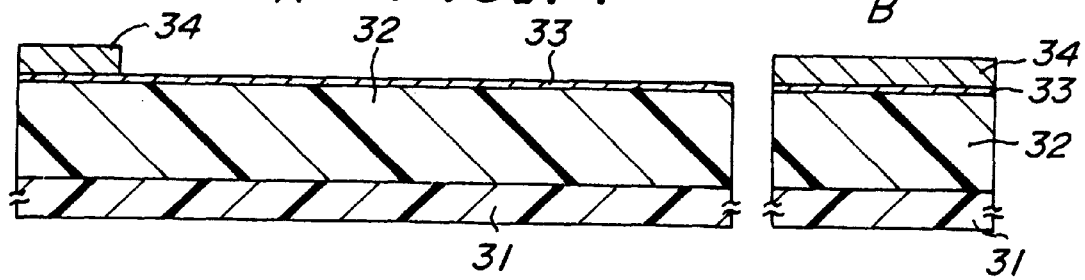
FIGS. 14A and 14B are cross sectional views showing a next step.

Next, as illustrated in FIG. 14, first and second magnetic layers 33 and 34 are formed on the alumina insulating layer 32, said first and second magnetic layers constituting a bottom magnetic shield which protects a reading MR element from an external magnetic field. That is to say, the first magnetic layer 33 made of a permalloy is formed by sputtering on a whole surface of the alumina insulating layer 32 with a thickness of about 70–150 nm, in the present embodiment about 100 nm, and then the second magnetic layer 34 made of a permalloy is formed, by electroplating, on a portion of the first magnetic layer 33 at which an MR element, in the present embodiment GMR element, is to be formed later with a thickness of about 2–3 $\mu$m, in the present embodiment about 3 $\mu$m.

According to the invention, the thin first magnetic layer 33 is formed on a whole surface and then the second magnetic layer 34 thicker than the first magnetic layer is selectively formed on the first magnetic layer at an area at which at least conductive layers for the GMR element will not be formed later. However, according to the invention, the second magnetic layer 34 may be formed only at an area at which the GMR element will be formed layer or at a wider area.

Figure 15:
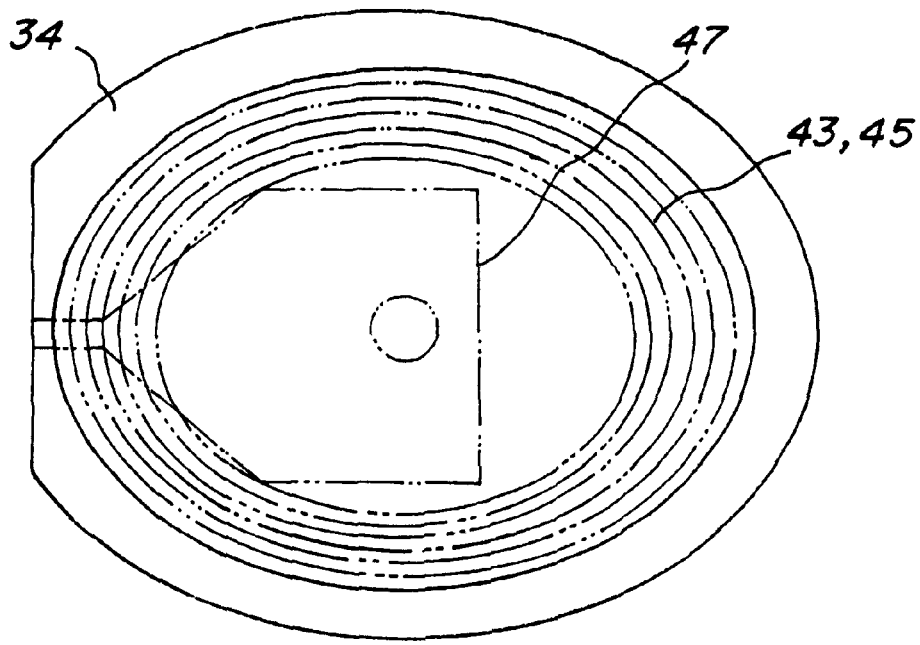
FIG. 15 is a plan view depicting the structure at the step of FIG. 14.
Figure 16:
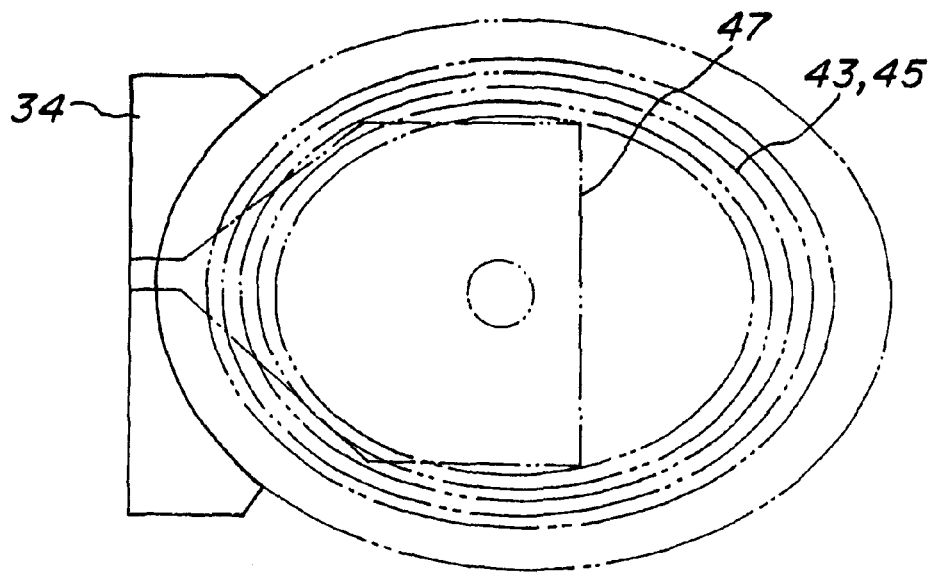
FIG. 16 is a plan view representing another embodiment of the structure at the step of FIG. 14.

In the present embodiment, as depicted in a plan view of FIG. 15, the second magnetic layer 34 is formed to include an area at which the GMR element will be formed later as well as to surround an area at which a third magnetic layer will be formed later. According to the invention, the second magnetic layer 34 may be formed not at an area at which the third magnetic layer will be formed later. It should be noted that in FIGS. 15 and 16, for the sake of clarity, a fourth magnetic layer 47 and a thin film coil 43, 45 which will be formed later are also shown by imaginary lines.

Figure 17:
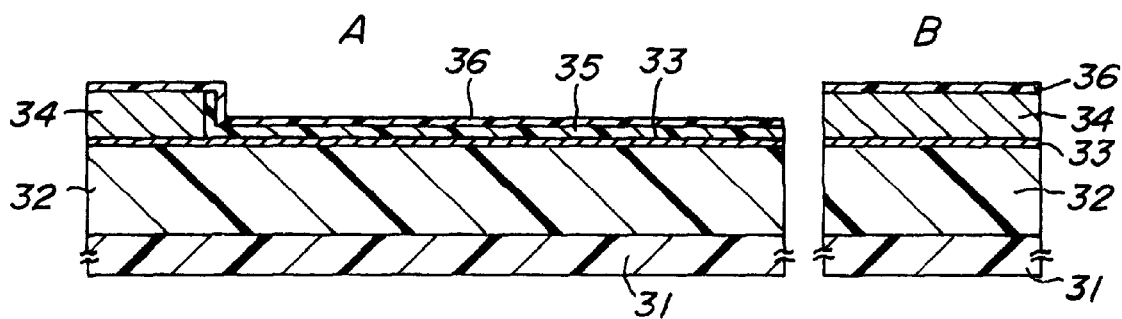

Next as shown in FIG. 17, a first insulating layer 35 made of alumina, silicon oxide or silicon nitride and having a thickness of about 500 nm is formed on the exposed surface of the first magnetic layer 33 as well as on a side wall of the second magnetic layer 34. Then a first shield gap layer 36 made of alumina is formed on a whole surface by sputtering with a thickness of about 100–150 nm.

Figure 18:
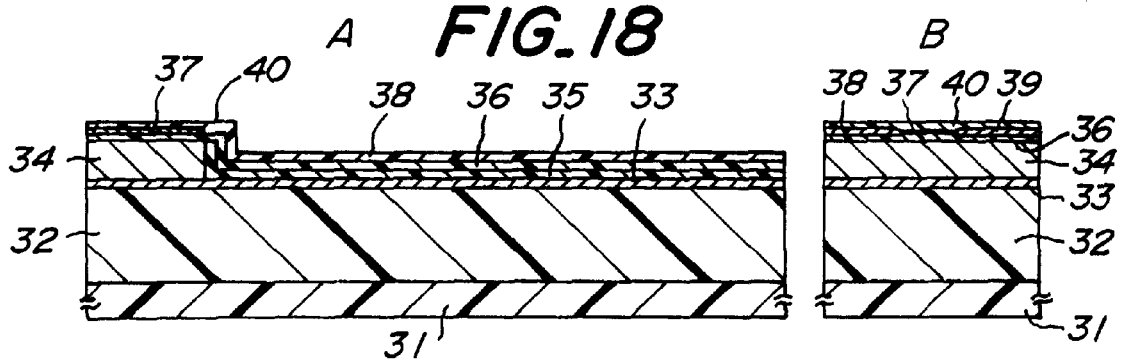

Next as illustrated in FIG. 18, a GMR layer 37 having a giant magnetoresistive effect is formed with a thickness of several tens nanometers on a portion of the first shield gap layer 36 situating on the second magnetic layer 34, and then the GMR layer is shaped into a given pattern by means of a highly precise mask alignment. Then, a pair of conductive layers 38 and 39 are formed in accordance with a given pattern, said conductive layers being connected to both ends of the GMR layer 37. After that, a second shield gap layer 40 having a thickness of about 100–150 nm is formed on the first shield gap layer 36 such that said GMR layer 37 is embedded within the first and second shield gap layers 36 and 40. It should be noted that the first and second shield gap layers 36 and 40 extend from the second magnetic layer 34 onto the first insulating layer 35 over the step.

Figure 19:
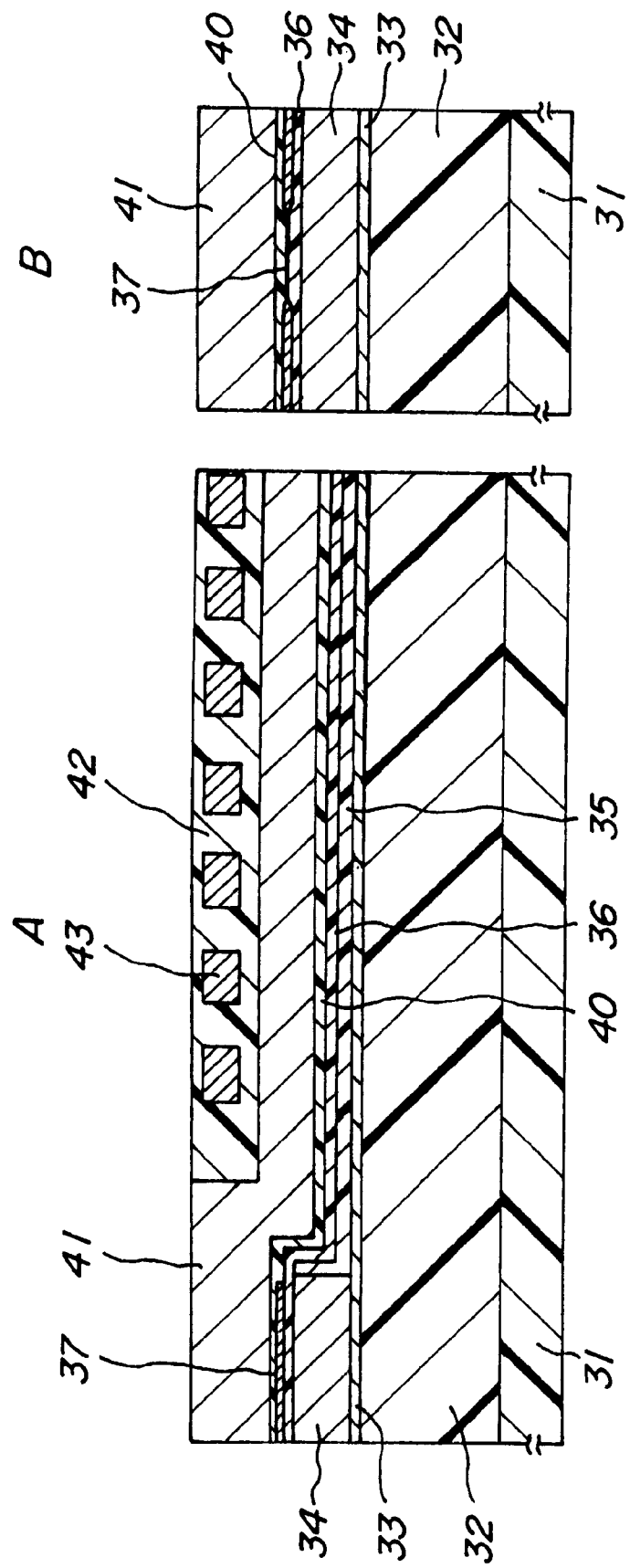

Next, as depicted in FIG. 19, a third magnetic layer 41 having a thickness of about 3–4 µm is formed on the second shield gap layer 40 over the step. This third magnetic layer 41 serves as the top shield for the GMR element as well as the bottom pole of the inductive type thin film magnetic head. The third magnetic layer 41 includes a first portion situating above the second magnetic layer 34 and a second portion situating above the first insulating layer 35.

Further, on the second portion of the third magnetic layer 41 situating closer to the substrate, is formed a first layer thin film coil 43 such that the thin film coil is supported by a second insulating layer 42 in an electrically insulated manner. In the present embodiment, the second insulating layer 42 is formed to be coplanar with a surface of the first portion of the third magnetic layer 41 situating above the second magnetic layer 34. That is to say, after forming the second insulating layer 42 such that the surface of said portion of the third magnetic layer 41 is covered with the second insulating layer, the second insulating layer is polished by the chemical mechanical polishing (CMP) until the surface of said first portion of the third magnetic layer is exposed.

Figure 20:
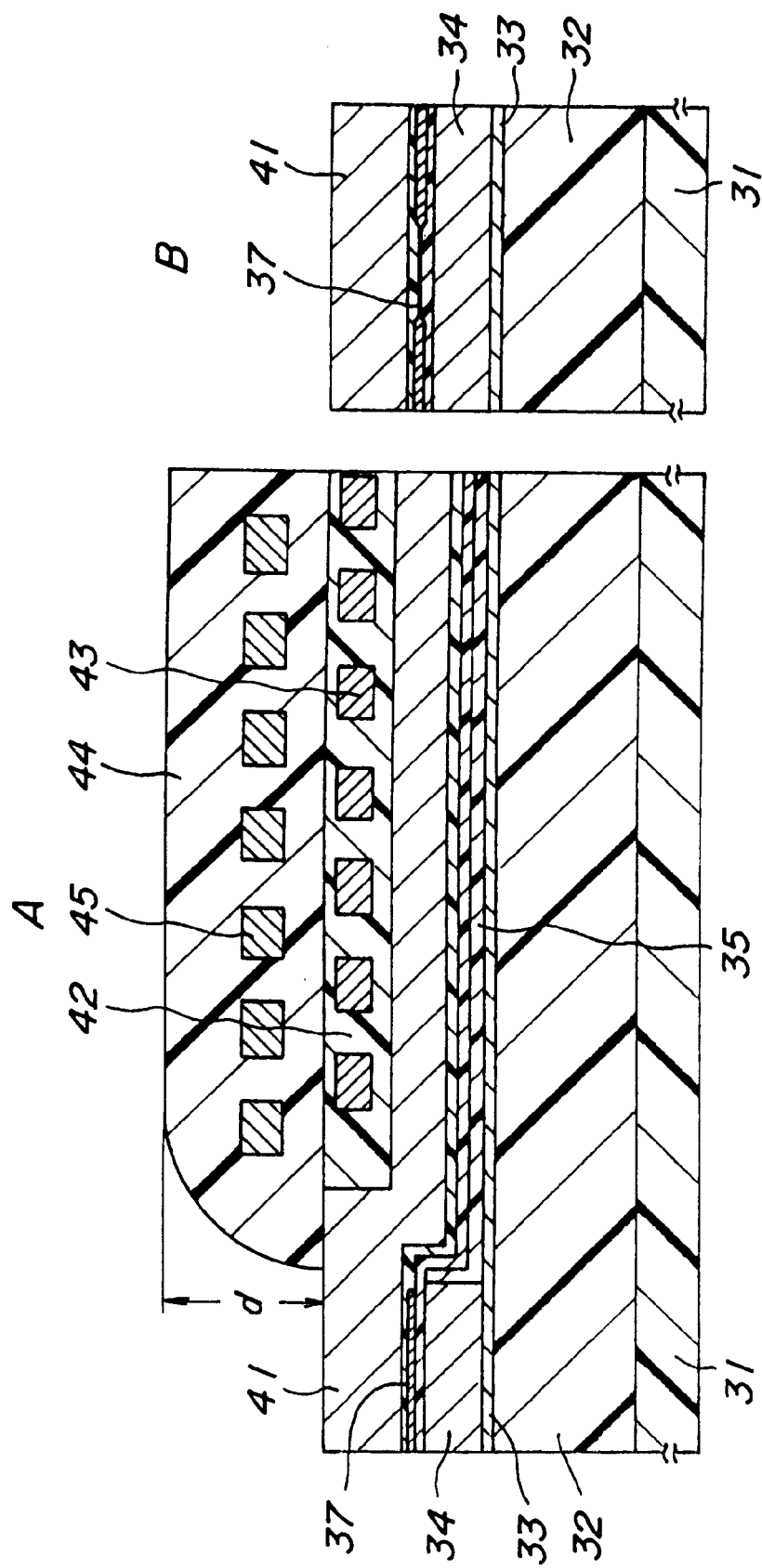

Then, as shown in FIG. 20, on the flat surface of the second insulating layer 42 supporting the first layer thin film coil 43 in an electrically insulating manner, is formed a second layer thin film coil 45 such that the second layer thin film coil is supported by a third insulating layer 44 in an electrically insulated manner.

In the present embodiment, the first layer thin film coil 43 supported by the second insulating layer 42 is formed not to protrude beyond the surface of the first portion of the third magnetic layer 41 situating above the second magnetic layer 34. Therefore, a distance d from the surface of the third insulating layer 44 to the surface of the first portion of the third magnetic layer 41 can be reduced as compared with the conventional thin film magnetic head. An amount of this reduction in the distance d is substantially equal to the thickness of the second magnetic layer 34, i.e. about 2–3 µm.

Figure 21:
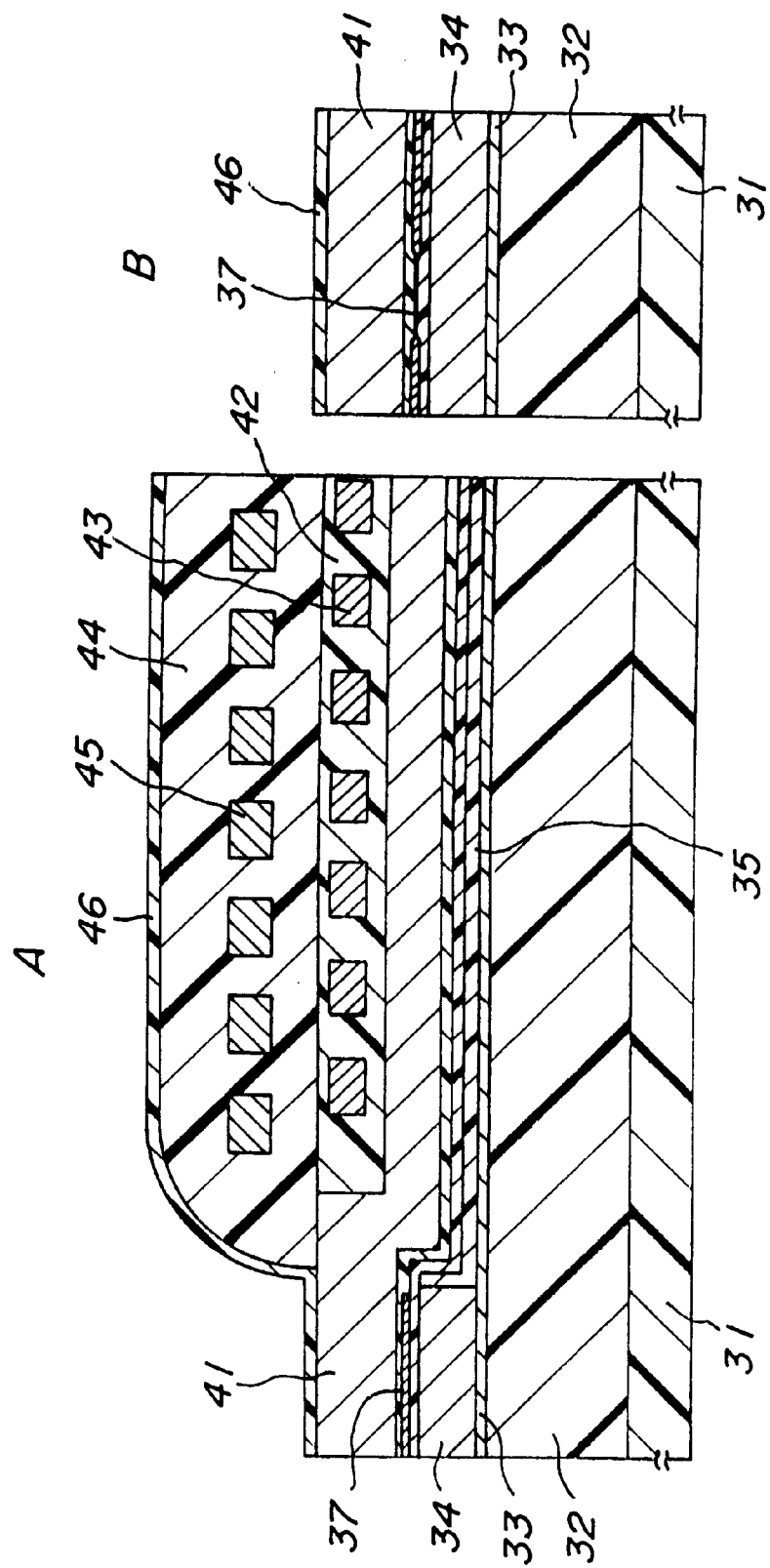
Figure 22:
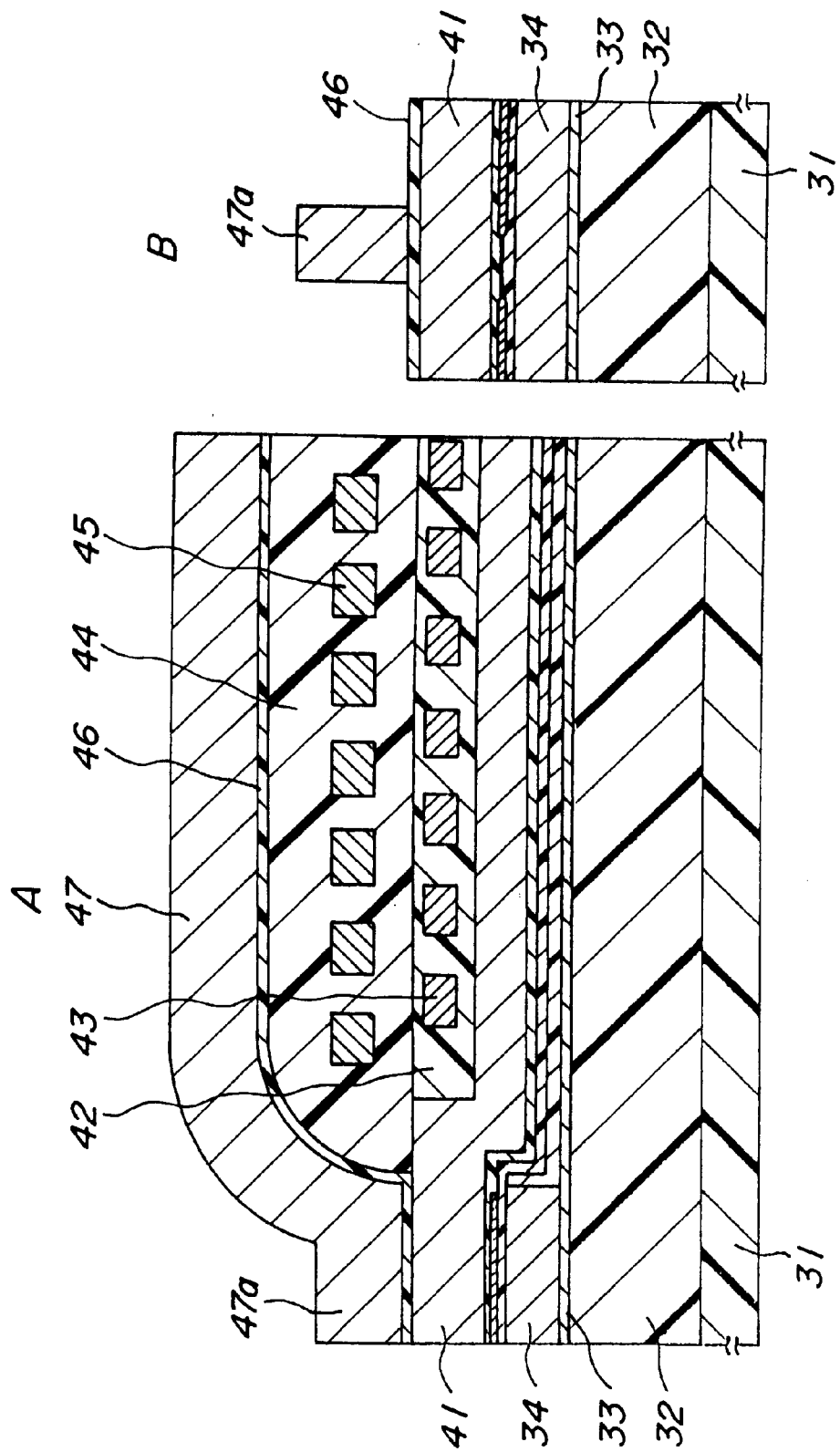

Next, as shown in FIG. 21, a write gap layer 46 made of alumina and having a thickness of about 150–300 nm is deposited on the exposed surface of the first portion of the third magnetic layer 41 and the surface of the third insulating layer 44. Then, as illustrated in FIG. 22, a fourth magnetic layer 47 is formed on the write gap layer 46 with a thickness of about 3–4 µm, said fourth magnetic layer serving as a top pole of the inductive type thin film magnetic head.

According to the present invention, as explained above, the distance d between the surface of the first portion of the third magnetic layer 41 situating above the second magnetic layer 34 and the top surface of the second third insulating layer 44 is small, and therefore a photoresist layer used for forming a pole portion 47a of the fourth magnetic layer 47 in the photolithography has a not excessively large thickness even at the first portion of the third magnetic layer 41 and a fine patterning can be performed accurately. In this manner, the pole portion 47a of the fourth magnetic layer can have a width about 1 µm or smaller than 1 µm.

In the present embodiment, the first portion of the third magnetic layer 41 is selectively etched using the pole portion 47a as a mask to form a trim structure. This etching may be performed by ion beam etching or reactive ion etching.

Figure 23:
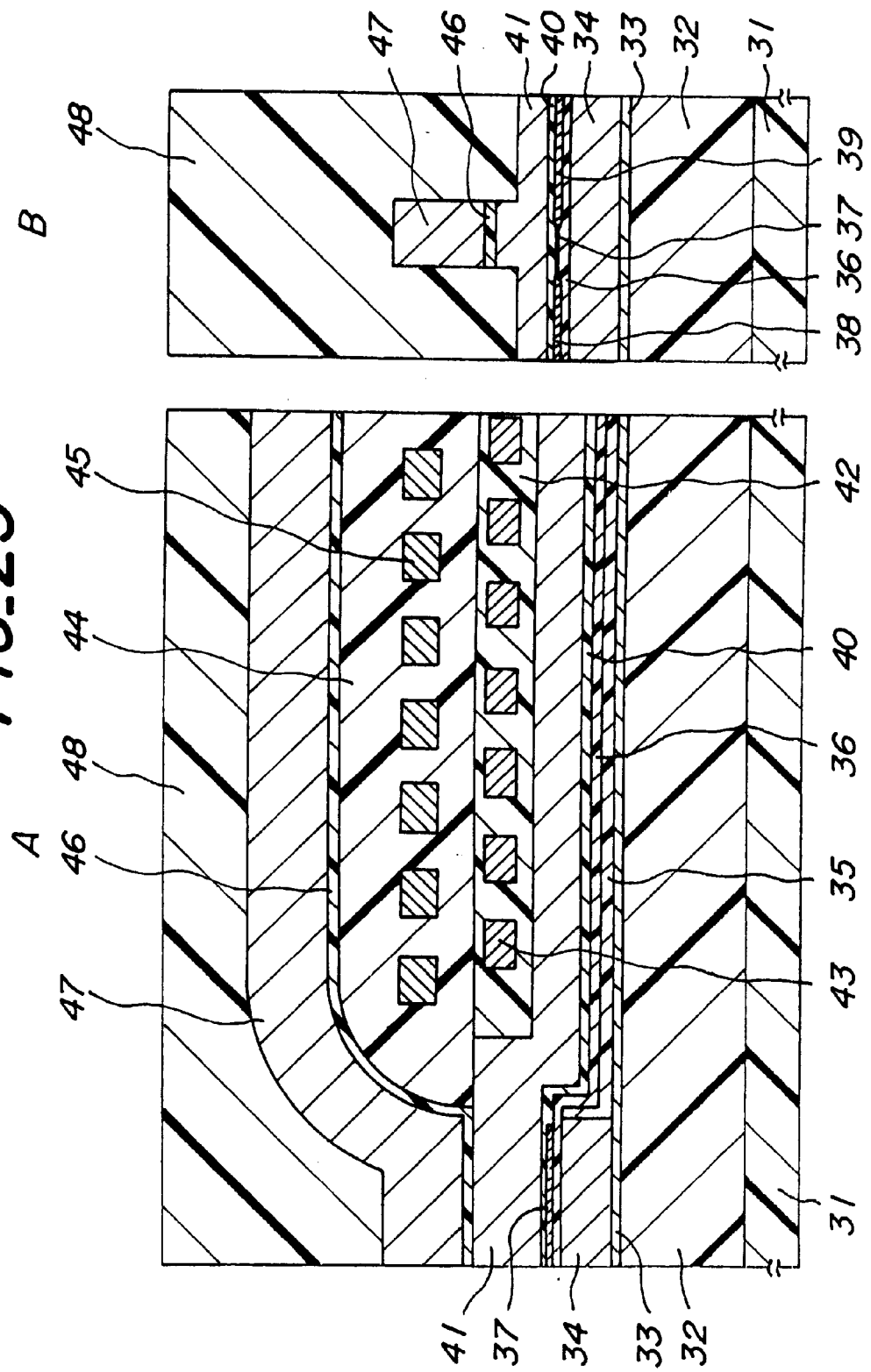

Finally, as shown in FIG. 23, an overcoat layer 48 made of alumina is formed on the fourth magnetic layer 47 as well as the remaining exposed surfaces. In an actual manufacturing process of the combination type thin film magnetic head, after forming a number of thin film magnetic head units on the wafer in matrix, the wafer is divided into a plurality of bars in each of which a plurality of thin film magnetic head units are aligned, a side wall of a bar is polished to form simultaneously air bearing surfaces of a plurality of thin film magnetic head units in the bar, and then the bar is divided into respective combination type thin film magnetic heads.

Figure 24:
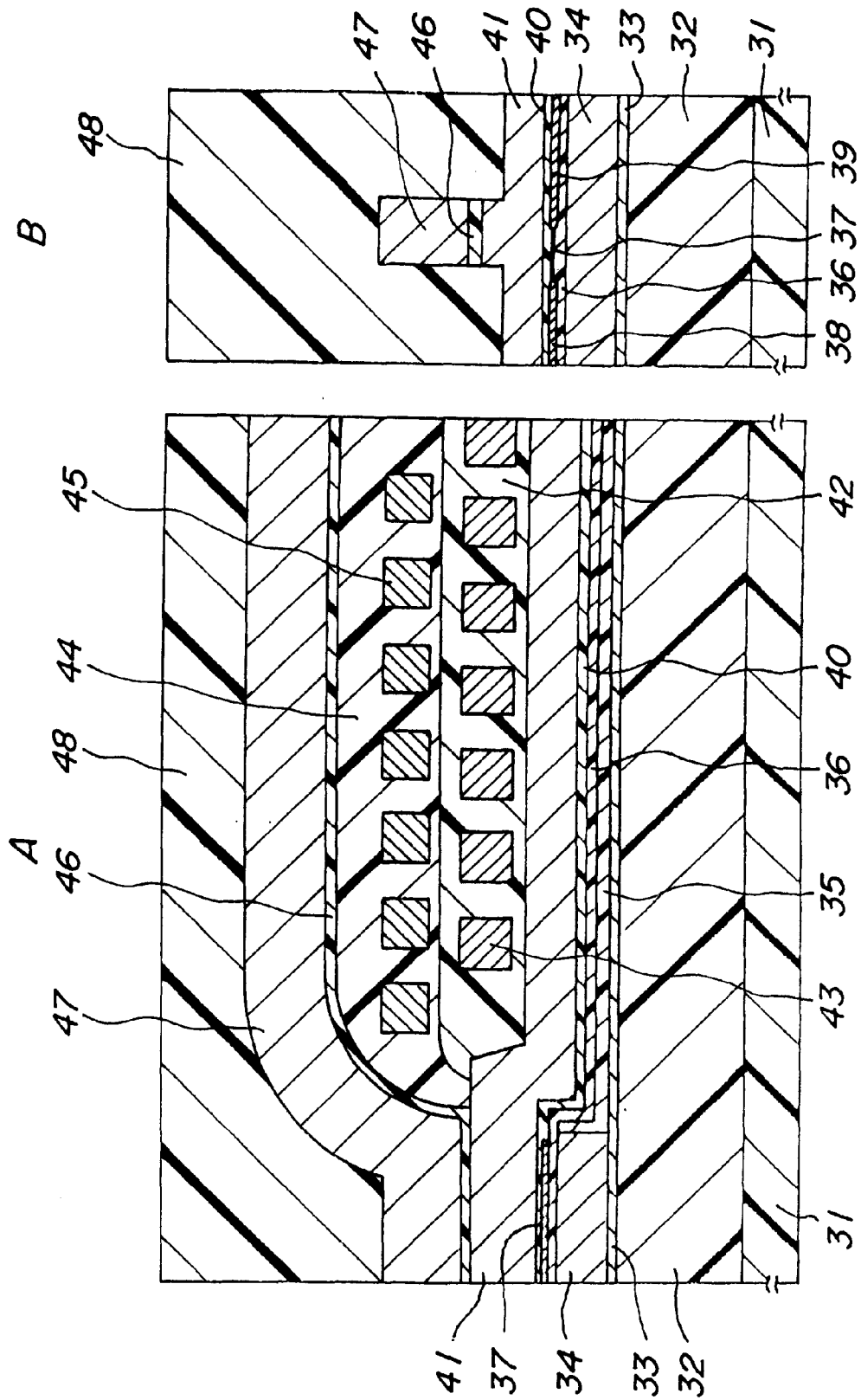
FIGS. 24A and 24B are cross sectional views showing another embodiment of the combination type thin film magnetic head according to the invention.

FIGS. 24A and 24B are cross sectional views showing a second embodiment of the combination type thin film magnetic head according to the invention. In FIG. 24, portions similar to those of the previous embodiment are denoted by the same reference numerals used in the previous embodiment and detailed explanation thereof is dispensed with.

In the present embodiment, the top surface of the second insulating layer 42 supporting the first layer thin film coil 43 protrudes beyond the surface of the first portion of the third magnetic layer 41 situating above the second magnetic layer 34. In this case, it is preferable that more than a half of a height of the second insulating layer 42 does not protrude beyond the surface of the first portion of the third magnetic layer 41 in order to reduce the above mentioned distance d. If more than a half of a height of the second insulating layer 42 protrudes the surface of the first portion of the third magnetic layer 41, a reduction in the distance d could not be attained and the photoresist has a larger thickness at the first portion of the third magnetic layer and the object of the present invention could not be obtained sufficiently.

Figure 25:
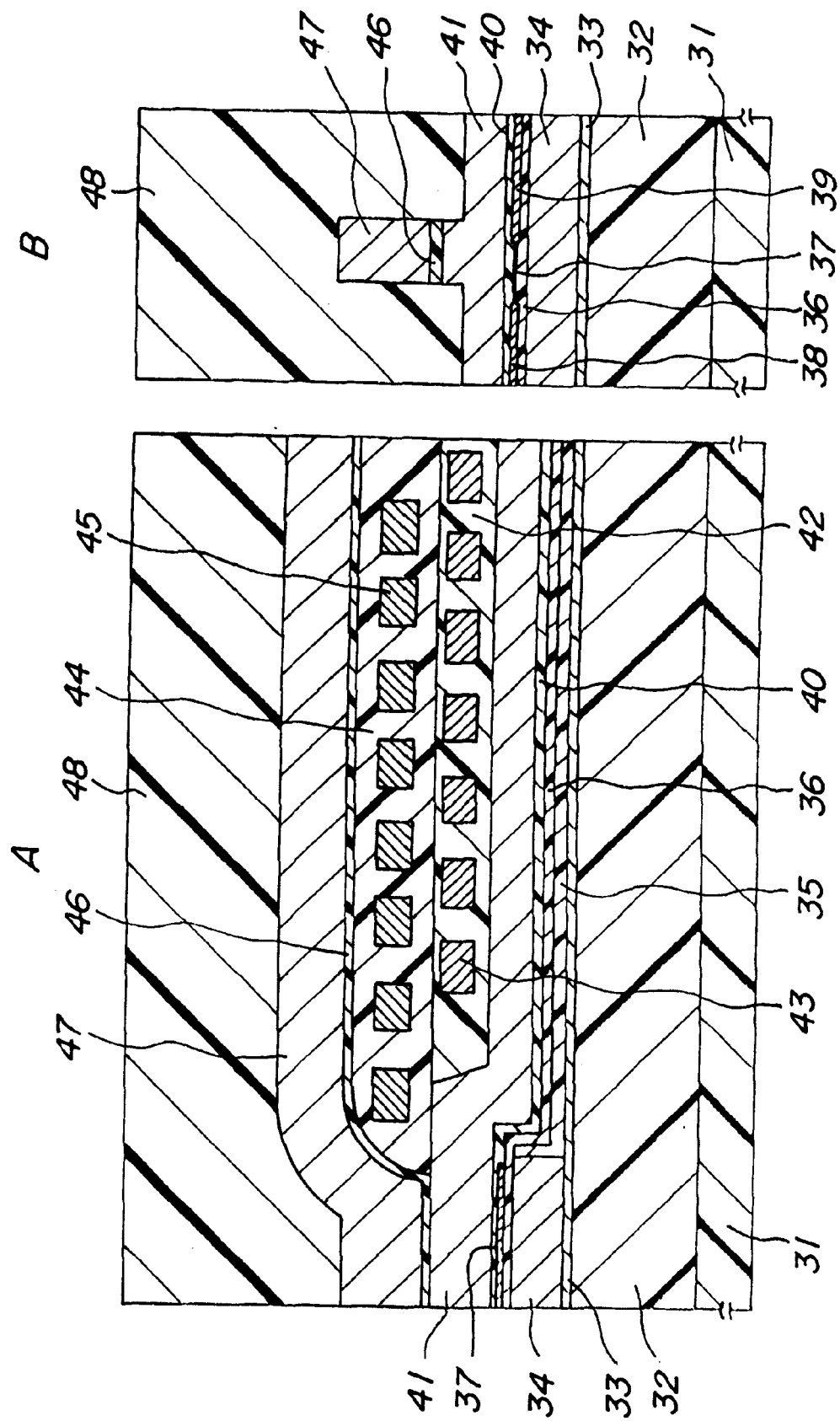
FIGS. 25A and 25B are cross sectional views illustrating a third embodiment of the combination type thin film magnetic head according to the invention.

FIGS. 25A and 25B are cross sectional views showing a third embodiment of the combination type thin film magnetic head according to the invention. In this embodiment, a front end portion of the second layer thin film coil 45 supported by the third insulating layer 44 is formed to be stacked on the first portion of the third magnetic layer 41 situating above the second magnetic layer 34. Then, a distance between the pole portion of the inductive type thin film magnetic head and the thin film coil 45 can be reduced, and therefore the efficiency of the magnetic flux is improved and the inductive type thin film magnetic head having a higher efficiency can be obtained.

The present invention is not limited to the embodiments explained above, but many alternations and modifications can be conceived by a person skilled in the art within the scope of the invention. For instance, in the above explained embodiments, the second magnetic layer 34 is formed over a wide area including an area at which the MR element is formed, but according to the invention the second magnetic layer may be formed at a restricted area at which the MR element is formed. Moreover, in the above embodiments, the first and second magnetic layers 33 and 34 are made of a permalloy of Ni—Fe (Ni:80%, Fe:20%), but according to the invention these magnetic layers may be made of a magnetic material having a higher saturation magnetic flux density such as permalloy of Ni—Fe (Ni:50%, Fe:50%), iron nitride (FeN) and amorphous such as Fe—Co—Zr. Furthermore, the magnetic layer may be made of a stack of a multiple magnetic layers. In this case, a non-magnetic layer may be provided between magnetic material layers. In the above embodiment, MR element is formed by the GMR layer, but according to the invention, the MR element may be formed by the AMR layer.

In the second embodiment shown in FIGS. 24A and 24B, a front portion of the second thin film coil may be formed on the first portion of the third magnetic layer situating above the second magnetic layer.

As explained above, in the combination type thin film magnetic head according to the invention, the thin first magnetic layer 33 and thick second magnetic layer 34 constitute the bottom shield member of the magnetoresistive type thin film magnetic head, the improved heat dissipation can be obtained and the problem of the thermal asperity can be solved. Moreover, since the first magnetic layer is formed on the whole surface, the MR element can be effectively protected from the external magnetic field and the reproducing property of the MR element can be improved.

Moreover, since a part of the thin film coil is formed on the second portion of the third magnetic layer situating closer to the substrate, the distance d between the surface of the first portion of the third magnetic layer and the top surface of the thin film coil can be smaller. Therefore, the photoresist layer for patterning the fourth magnetic layer can have a rather uniform thickness, and the photoresist can be shaped into a fine structure, and the pole portion of the fourth magnetic layer can be formed to have a very narrow width. For instance, a width of the pole portion of the fourth magnetic layer can be smaller than 1 µm, and the surface recording density can be improved.

Furthermore, when a part of the second layer thin film coil 45 is formed on the first portion of the third magnetic layer 41 situating above the second magnetic layer 34, a distance between the pole portion and the thin film coil can be further reduced, and the magnetic flux can be utilized very efficiently and the combination type thin film magnetic head can have an improved efficiency.

What is claimed is:

1. A combination type thin film magnetic head having an inductive type writing thin film magnetic head and a magnetoresistive type reading thin film magnetic head stacked on a surface of a substrate in a magnetically and electrically isolated manner, comprising:

a substrate having a surface;

a first magnetic layer formed on the surface of the substrate and having a first thickness;

a second magnetic layer having a second thickness larger than said first thickness and being formed on a part of said first magnetic layer such that a step is formed in surfaces of the first and second magnetic layers;

a first insulating layer formed on the surface of said first magnetic layer and on a side surface of said second magnetic layer at said step, said first insulating layer having a third thickness which is smaller than said second thickness of the second magnetic layer;

a shield gap layer having a first portion formed on the second magnetic layer and a second portion formed on the first magnetic layer over said step such that the shield gap layer includes a step;

a magnetoresistive element embedded within said first portion of said shield gap layer formed on said second magnetic layer;

a third magnetic layer having a first portion formed on said first portion of the shield gap layer situating above said second magnetic layer and a second portion formed on a surface of said second portion of the shield gap layer situating above said first insulating layer, said third magnetic layer extending over said step;

a thin film coil at least a part of which is arranged on the second portion of the third magnetic layer situating on said second portion of the shield gap layer, said thin film coil being supported by a second insulating layer in an electrically insulated manner;

a write gap layer formed to extend from the first portion of the third magnetic layer situating above said first portion of the shield gap layer to the surface of said second insulating layer supporting said thin film coil; and a fourth magnetic layer formed on said write gap layer.

2. A combination type thin film magnetic head according to claim 1, wherein said second magnetic layer is formed at an area on the first magnetic layer except for an area at which conductive layers for the magnetoresistive element are formed.

3. A combination type thin magnetic head according to claim 1, wherein said second magnetic layer is formed only at an area on the first magnetic layer at which the magnetoresistive element is formed.

4. A combination type thin film magnetic head according to claim 1, wherein said first and second magnetic layers are made of a permalloy of Ni:80%, Fe:20%.

5. A combination type thin film magnetic head according to claim 1, wherein said first and second magnetic layers are made of a magnetic material having a high saturation magnetic flux density.

6. A combination type thin film magnetic head according to claim 5, wherein said magnetic material is selected from the group consisting of a permalloy of Ni:50%, Fe:50%, an iron nitride (FeN) and an amorphous of Fe—Co—Zr.

7. A combination type thin film magnetic head according to claim 1, wherein said first thickness of the first magnetic layer which serves as one of magnetic shield layers together with said second magnetic layer is set to a value within a range of about 70–150 nm, and said second thickness of said second magnetic layer is set to a value within a range of about 2–3 µm.

8. A combination type thin film magnetic head according to claim 7, wherein said thin film coil comprises first and second layer thin film coils, and the first layer thin film coil is formed to be coplanar with the surface of the first portion of the third magnetic layer situating above the second magnetic layer.

9. A combination type thin film magnetic head according to claim 7, wherein said thin film coil comprises first and second layer thin film coils, and the first layer thin film coil is formed such that more than a half of a height of the first layer thin film coil does not protrude beyond the surface of said first portion of the third magnetic layer.

10. A combination type thin film magnetic head according to claim 8 or 9, wherein said second layer thin film coil is formed such that a part of the second thin film coil layer is imposed on said first portion of the third magnetic layer situating above the second magnetic layer.

11. A method of manufacturing a combination type thin film magnetic: head having a magnetoresistive type thin film magnetic head and an inductive type thin film magnetic head stacked on the magnetoresistive type thin film magnetic head comprising:

the step of forming a first magnetic layer a surface of a substrate;

the step of selectively forming a second magnetic layer on at least a portion of said first magnetic layer at which a magnetoresistive element will be formed later, said second magnetic layer being thicker than said first magnetic layer and constituting a step in the surfaces of the first and second magnetic layers;

the step of forming a first insulating layer on the surface of said first magnetic layer and on a side wall of said second magnetic layer at said step, said first insulating layer being thinner than said second magnetic layer and including a step;

the step of forming a shield gap layer to extend from the surface of the second magnetic layer to the surface of the first magnetic layer over said step, while a magnetoresistive layer is formed to be embedded within a first portion of said shield gap layer situating above said second magnetic layer;

the step of forming a third magnetic layer on the shield gap layer over said step such that the third magnetic layer includes a first portion formed on a surface of said first portion of the shield gap layer situating above said second magnetic layer and a second portion formed on a surface of a second portion of the shield gap layer situating above said first insulating layer;

the step of forming a thin film coil such that at least a part of the thin film coil is arranged on the second portion of the third magnetic layer situating on said second portion of the shield gap layer and the thin film coil is supported by a second insulating layer in an electrically insulated manner;

the step of forming a write gap layer to extend from the first portion of the third magnetic layer situating above said first portion of the shield gap layer to a surface of said second insulating layer supporting said thin film coil; and the step of forming a fourth magnetic layer on said write gap layer.

12. A method according to claim 11, wherein said step of forming the thin film coil includes a step of forming a first layer thin film coil on the second portion of the third magnetic layer such that the top surface of the second insulating layer becomes coplanar with the surface of the first portion of the third magnetic layer, and a step of forming a second layer thin film coil on the flat surface of the second insulating layer.

13. A method according to claim 12, wherein said second layer thin film coil is formed such that a part of the second layer thin film coil is superimposed on the first portion of the third magnetic layer.

14. A method according to claim 11, wherein said step of forming the thin film coil includes a step of forming a first layer thin film coil on the second portion of the third magnetic layer such that more than a half of a height of the first layer thin film coil does not protrude beyond the surface of the first portion of the third magnetic layer, and a step of forming a second layer thin film coil on the second insulating layer.

15. A method according to claim 14, wherein said second layer thin film coil is formed such that a part of the second layer thin film coil is superimposed on the first portion of the third magnetic layer.

\* \* \* \* \*